United States Patent Office 3,814,771
Patented June 4, 1974

3,814,771
5-PHENYL-2-PIPERIDONES AND 5-PHENYL-2-THIOPIPERIDONES
Tsung-Ying Shen, 858 Willow Grove Road, and Bruce E. Witzel, 206 N. Euclid Ave., both of Westfield, N.J. 07090
No Drawing. Continuation-in-part of application Ser. No. 91,175, Nov. 19, 1970, now Patent No. 3,718,743, which is a continuation-in-part of abandoned application Ser. No. 808,660, Mar. 19, 1969. This application July 19, 1972, Ser. No. 273,233
Int. Cl. C07d 29/36
U.S. Cl. 260—293.73
3 Claims

ABSTRACT OF THE DISCLOSURE

Novel 5-phenyl-2-piperidone and 5-phenyl-2-thiopiperidone compounds and the processes for preparing the same are disclosed. In addition the invention concerns piperidones and thiopiperidones which exhibit anti-inflammatory properties and also possess an effective degree of antipyretic and analgesic activity.

---

This application is a continuation of pending United States application Ser. No. 91,175, filed Nov. 19, 1970, which was issued to Pat. No. 3,718,743 on Feb. 27, 1973, which application is a continuation-in-part of United States application Ser. No. 808,660, filed Mar. 19, 1969, now abandoned.

This invention relates to a novel class of 5-phenyl-2-piperidones and thiopiperidones and derivatives thereof which are useful in the treatment of inflammation and which also exhibit potent analgesic and antipyretic actviity. The invention further relates to pharmaceutical compositions containing said materials and methods of treating inflammation, pain and fever.

The present invention embraces the novel compounds having the structural formulae as shown in FIGS. Ia and Ib:

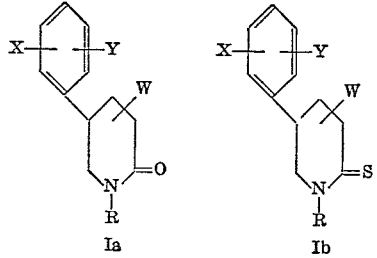

Ia          Ib where

R is hydrogen, alkyl (preferably lower alkyl such as methyl, ethyl, propyl, etc.), alkenyl (preferably lower alkenyl such as vinyl, allyl, methallyl, etc.), alkynyl (preferaby lower alkynyl such as ethynyl, methylbutynyl, etc.), aralkenyl (preferably arloweralkenyl such as phenylpropylenyl, phenylbutylenyl, etc.), aryl (preferably phenyl) or substituted phenyl (such as tolyl, halophenyl, anisyl, etc.), aralkyl (preferably arloweralkyl such as benzyl, phenethyl, etc.), acyl (such as acetyl, propionyl, benzoyl, etc.), and dialkylaminoalkyl (preferably diloweralkylaminolower alkyl, such as diethylaminoethyl, etc.);

W is hydrogen, halogen (such as fluoro, chloro, bromo, etc.), halo alkyl (such as CF$_3$), amino, dialkylamino (preferably diloweralkylamino such as dimethylamino, diethylamino, methylethylamino, etc.), dialkylaminoalkyl (preferably diloweralkylaminoloweralkyl such as dimethylaminomethyl, diethylaminomethyl, etc.), carboalkoxyalkyl (preferably carboloweralkoxyloweralkyl such as carbomethoxymethyl, carboethoxymethyl, etc.)

and hydroxy; W can be substituted at the 3, 4, 5 or 6-positions; and

X and Y are each hydrogen, alkyl (preferably loweralkyl as methyl, ethyl, propyl, etc.), halogen (such as fluoro, chloro, bromo, etc.), haloalkyl (preferably halolower-alkyl such as fluoromethyl, trichloromethyl, trifluoromethyl, etc.), aryl (preferably phenyl, naphthyl, substituted phenyl, such as tolyl, halophenyl, alkoxyphenyl, etc.), nitro, amino, acylamino (such as acetylamino, etc.), acyl (such as acetyl, propionyl, benzoyl, etc.), carboxy, carboalkoxy (preferably carboloweralkoxy such as carbomethoxy, carboethoxy, etc.), carbamyl, dialkylsulfamyl (preferably diloweralkylsulfamyl such as dimethylsulfamyl), alkylamino (prefearbly loweralkylamino such as methylamino, ethylamino, etc.), and dialkylamino (preferably diloweralkylamino such as dimethylamino, diethylamino, etc.), alkylmercapto (preferably loweralkylmercapto, such as methylmercapto, etc.), alkylsulfinyl (preferably loweralkylsulfinyl, such as methylsulfinyl, etc.), alkylsulfonyl (preferably loweralkylsulfonyl, such as methylsulfonyl, etc.); X and Y can be substituted at the 2, 3, 4, 5 and 6-positions;

with the proviso that W, X, Y and R must not be all hydrogen at the same time, and when R is alkyl, W, X or Y must be other than hydrogen and when W is halogen, dialkylamino or dialkylaminoalkyl, R, X or Y must be other than hydrogen.

In its more preferred aspects, this invention relates to the class of chemical compounds having the structural formulae as shown in FIGS. Ia and Ib where R is hydrogen; W is hydrogen or halogen; and X and Y are hydrogen, halogen, haloalkyl, nitro, alkylamino and alkyl.

The invention further relates to 5-phenyl-2-piperidones and thiopiperidones as represented by Formulas IIa and IIb which are useful in the treatment of inflammation, pain and fever and are components of pharmaceutical compositions that are utilized in such treatment:

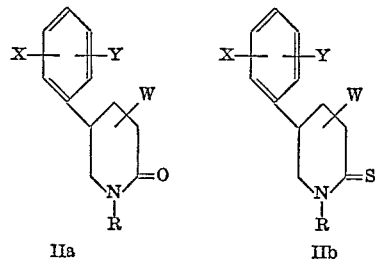

IIa          IIb where

R is hydrogen, alkyl (preferably lower alkyl such as methyl, ethyl, propyl, etc.), alkenyl (preferably lower alkenyl such as vinyl, allyl, methallyl, etc.), alkynyl (preferably lower alkynyl such as ethynyl, methylbutynyl, etc.), aralkyl (preferably arloweralkyl such as benzyl, phenethyl, etc.), aralkenyl (preferably arloweralkenyl such as phenylpropylenyl, phenylbutylenyl, etc.), aryl (preferably phenyl) or substituted phenyl (such as tolyl, halophenyl, anisyl, etc.), acyl (such as acetyl, propionyl, benzoyl, etc.) and dialkylaminoalkyl (preferably diloweralkylaminolower alkyl, such as diethylaminoethyl, etc.);

W is hydrogen, halogen (such as fluoro, chloro, bromo, etc.), halo alkyl (such as CF$_3$) alkyl (preferably lower alkyl such as methyl, ethyl, propyl, etc.), amino, dialkylamino (preferably diloweralkylamino such as dimethylamino, diethylamino, methylethylamino, etc.), dialkylaminoalkyl (preferably diloweralkylaminolow-eralkyl such as dimethylaminomethyl, diethylaminomethyl, etc.), aryl (preferably phenyl or substituted phenyl), carboalkoxy (preferably carboloweralkoxy such as carbomethoxy, carboethoxy, etc.), carboalkoxyalkyl (preferably carboloweralkoxyloweralkyl such as hydroxy; W can be substituted at the 3, 4, 5 or 6-carbomethoxymethyl, carboethoxymethyl, etc.), and positions; and X and Y are each hydrogen, alkyl (preferably loweralkyl such as methyl, ethyl, propyl, etc.), halogen (such as fluoro, chloro, bromo, etc.), hydroxy, alkoxy (preferably lower alkoxy such as methoxy, ethoxy, propoxy, etc.), haloalkyl (preferably haloloweralkyl such as fluoromethyl, trichloromethyl, trifluoromethyl, etc.), aryl (preferably phenyl, naphthyl, substituted phenyl, such as tolyl, halophenyl, alkoxyphenyl, etc.), nitro, amino, acylamino (such as acetylamino, etc.), acyl (such as acetyl, propionyl, benzoyl, etc.), carboxy, carboalkoxy (preferably carboloweralkoxy such as carbomethoxy, carboethoxy, etc.), carbamyl, dialkylsulfamyl (preferably diloweralkylsulfamyl such as dimethylsulfamyl), alkylamino (preferably loweralkylamino such as methylamino, ethylamino, etc.) and dialkylamino (preferably diloweralkylamino such as dimethylamino, diethylamino, etc.), alkylmercapto (preferably loweralkylmercapto, such as methylmercapto, etc.), alkylsulfinyl (preferably loweralkylsulfinyl, such as methylsulfinyl, etc.), alkylsulfonyl (preferably loweralkylsulfonyl, such as methylsulfonyl, etc.): X and Y can be susbstituted at the 2, 3, 4, 5 and 6-positions.

In its more preferred aspects, this invention relates to the class of chemical compounds having the structural formulae as shown in FIGS. IIa and IIb where R is hydrogen; W is hydrogen, halogen or alkyl; and X and Y are hydrogen, halogen, alkoxy, haloalkyl, nitro, alkylamino and alkyl.

Representative compounds of this invention are as follows:

5-(p-nitrophenyl)-2-piperidone
5-(p-chlorophenyl)-2-piperidone
5-(o-chlorophenyl)-2-thiopiperidone
5-(o-tolyl)-2-piperidone
5-(o-tolyl)-2-thiopiperidone
5-(p-fluorophenyl)-2-piperidone
5-(p-fluorophenyl)-2-thiopiperidone
5-(p-aminophenyl)-2-piperidone
5-(m-chlorophenyl)-5-carboethoxy-2-piperidone
5-(p-methoxyphenyl)-2-piperidone
5-(o,o'-dichlorophenyl)-2-piperidone
5-(p-methoxyphenyl)-3-methyl-1-acetyl-2-thiopiperidone
5-(p-nitrophenyl)-1-benzyl-2-piperidone
5-(p-biphenylyl)-5-methyl-2-thiopiperidone
5-phenyl-1-acetyl-2-piperidone
5-phenyl-3-chloro-1-methyl-2-thiopiperidone.

The piperidones and thiopiperidones of the invention possess a high degree of anti-inflammatory, analgesic and antipyretic activity. They are of value in the treatment of arthritic and dermatological disorders or like conditions responsive to anti-inflammatory drugs. In general they are indicated for a wide variety of conditions where one or more of the symptoms of inflamation, fever and pain are manifested. Exemplary of such conditions are rheumatic diseases, for example, rheumatoid arthritis, osteoarthritis, and other degenerative joint diseases, psoriatic arthritis, ankylosing spondylitis, gout, and rheumatic fever; soft-tissue rheumatism, for example, tendinitis, periarthritis, and periostitis; acute muscular rheumatism, for example, sciatica and the like; treatment of pain after fractures, pain and inflammation associated with dental surgery, and the like, human and veterinary disease conditions exhibiting the foregoing symptoms requiring the use of an anti-inflammatory, analgesic and/or anti-pyretic pharmaceutical composition.

For these purposes the compounds of the invention may be administered orally, topically, parenterally, by inhalation spray or rectally in formulations containing conventional non-toxic pharmaceutically acceptable carriers, adjuvants and vehicles. The term parenteral as used herein includes subcutaneous injections, intravenous, intramuscular, intrasternal injection or infusion techniques. In addition to the treatment of warm-blooded animals such as mice, rats, horses, dogs, cats, etc., the compounds of the invention are effective in the treatment of humans.

The pharmaceutical compositions containing the active ingredient may be in a form suitable for oral use, for example, as tablets, troches, lozenges, aqueous or oily suspensions, dispersible powders or granules, emulsions, hard or soft capsules, or syrups or elixirs. Compositions intended for oral use may be prepared according to any method known to the art for the manufacture of pharmaceutical compositions and such compositions may contain one or more agents selected from the group consisting of sweetening agents, flavoring agents, coloring agents and preserving agents in order to provide a pharmaceutically elegant and palatable preparation. Tablets contain the active ingredient in admixture with non-toxic pharmaceutically acceptable excipients which are suitable for the manufacture of tablets. These excipients may be, for example, inert diluents, such as calcium carbonate, sodium carbonate, lactose, calcium phosphate or sodium phosphate; granulating and disintegrating agents, for example, maize starch, or alginic acid; binding agents, for example starch, gelatine or acacia, and lubricating agents, for example magnesium stearate, stearic acid or talc. The tablets may be uncoated or they may be coated by known techniques to delay disintegration and absorption in the gastrointestinal tract and thereby provide a sustained action over a longer period. For example, a time delay material such as glyceryl monostearate or glyceryl distearate above or with a wax may be employed.

Formulations for oral use may also be presented as hard gelatine capsules wherein the active ingredient is mixed with an inert solid diluent, for example, calcium carbonate, calcium phosphate or kaolin, or as soft gelatine capsules wherein the active ingredient is mixed with water or an oil medium, for example arachis oil, peanut oil, liquid paraffin or olive oil.

Aqueous suspensions contain the active materials in admixture with excipients suitable for the manufacture of aqueous suspensions. Such excipients are suspending agents, for example sodium carboxymethylcellulose, methylcellulose, hydroxypropylmethylcellulose, sodium aginate, polyvinylpyrrolidone, gum tragacanth and gum acacia; dispersing or wetting agents may be a naturally-occurring phosphatide, for example lecithin, or condensation products of an alkylene oxide with fatty acids, for example polyoxyethylene stearate, or condensation products of ethylene oxide with long chain aliphatic alcohols, for example heptadecaethyleneoxycetanol, or condensation products of ethylene oxide with partial esters derived from fatty acids and a hexitol such as polyoxyethylene sorbitol mono-oleate, or condensation products of ethylene oxide with partial esters derived from fatty acids and hexitol anhydrides, for example polyoxyethylene sorbitan mono-oleate. The said aqueous suspensions may also contain one or more preservatives, for example ethyl, or n-propyl, p-hydroxy benzoate, one or more coloring agents, one or more flavoring agents, and one or more sweetening agents, such as sucrose, saccharin, or sodium or calcium cyclamate.

Oily suspensions may be formulated by suspending the active ingredient in a vegetable oil, for example arachis oil, olive oil, sesame oil or coconut oil, or in a mineral oil such as liquid paraffin. The oily suspensions may contain a thickening agent, for example besswax, hard paraffin or cetyl alcohol. Sweetening agents, such as those set forth above, and flavoring agents may be added to provide a palatable oral preparation. These compositions may be preserved by the addition of an anti-oxidant such as ascorbic acid.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example sweetening, flavoring and coloring agents, may also be present.

The pharmaceutical compositions of the invention may also be in the form of oil-in-water emulsions. The oily phase may be a vegetable oil, for example olive oil or arachis oils, or a mineral oil, for example liquid paraffin or mixtures of these. Suitable emulsifying agents may be naturally-occurring gums, for example gum acacia or gum tragacanth, naturally-occurring phosphatides, for example soya bean lecithin, and esters or partial esters derived from fatty acids and hexitol anhydrides, for example sorbitan mono-oleate, and condensation products of the said partial esters with ethylene oxide, for example polyoxyethylene sorbitan mono-oleate. The emulsions may also contain sweetening and flavoring agents.

Syrups and elixirs may be formulated with sweetening agents, for example glycerol, sorbitol or sucrose. Such formulations may also contain a demulcent, a preservative and flavoring and coloring agents.

The pharmaceutical compositions may be in the form of a sterile injectable preparation, for example as a sterile injectable aqueous or oleagenous suspension. This suspension may be formulated according to the known art using those suitable dispersing or wetting agents and suspending agents which have been mentioned above. The sterile injectable preparation may also be a sterile injectable solution or suspension in a non-toxic parenterally-acceptable diluent or solvent, for example as a solution in 1:3-butane diol. Among the acceptable vehicles and solvents that may be employed are water, Ringer's solution and isotonic sodium chloride solution. In addition, sterile, fixed oils are conventionally employed as a solvent or suspending medium. For this purpose any bland fixed oil may be employed including synthetic mono- or diglycerides. In addition, fatty acids such as oleic acid find use in the preparation of injectibles.

For parenteral administration aqueous fluid unit dosage forms can be prepared. In preparing the parenteral form, a measured amount of active ingredient is placed in a vial, and the vial and its contents are sterilized and sealed. An accompanying vial of sterile water is provided as a vehicle to form a suspension prior to administration. Advantageously, the sterile water can have dissolved therein a local anesthetic and a buffering agent. Parenteral aqueous solutions can be made by preparing a suitable pharmaceutically-acceptable salt of the active ingredient such as the acetate, citrate, tartrate, maleate, lactate and the like.

Alternatively, a parenteral suspension can be prepared by suspending the active ingredient in a parenterally-acceptable vegetable oil with or without additional adjuvants, and sterilizing after filling into vials.

For veterinary oral use the active ingredient is conveniently prepared in the form of a food premix. The food premix can comprise the active ingredient in admixture with an edible pharmaceutical diluent of the type previously mentioned such as starch, oatmeal, flour, calcium carbonate, talc, dried fish meal, and the like. The prepared premix is then conveniently added to the regular feed, thereby providing medication to the animal in the course of feeding.

The compounds of the invention may also be administered in the form of suppositories for rectal administration of the drug. These compositions can be prepared by mixing the drug with a suitable non-irritating excipient which is solid at ordinary temperatures but liquid at the rectal temperature and will therefore melt in the rectum to release the drug. Such materials are cocoa butter and polyethylene glycols.

For topical use, creams, ointments, jelies solutions or suspensions, etc. containing the anti-inflamatory agents are employed.

Dosage levels of the order of 0.5 to 100 mg. per kilogram of body weight per day are useful in the treatment of the above indicated conditions. Accordingly, inflammation is effectively treated and anti-pyretic and analgesic activity manifested by the administration from about .5 to 100 milligrams of the compound per kilogram of body weight per day. Advantageously oral administration of from about 2 mg. to about 50 mg. per kilogram of body weight and especially from about 4 mg. to about 20 mg./kg. per daily dosage produce highly effective results. Comparative dosages are used in parenteral, rectal and topical administration.

The amount of active ingredient that may be combined with the carrier materials to produce a single dosage form will vary depending upon the host treated and the particular mode of administration. For example, a formulation intended for the oral administration of humans may contain from 5 mg. to 5 grams of active agent compounded with an appropriate and convenient amount of carrier material which may vary from about 5 to about 95 percent of the total composition. Dosage unit forms will generally contain between from about 25 mg. to about 500 mg. of active ingredient.

The term "unit dosage form" as used in the specification and claims refers to physically discrete units suitable as unitary dosages for human subjects and animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effect to be achieved, and (b) the limitations inherent in the art of compounding such active material for therapeutic use in humans and animals, as disclosed in detail in this specification, these being features of the present invention.

Examples of suitable unit dosage forms in accord with this invention are tablets, capsules, pills, troches, powder packets, granules, wafers, cachets segregated multiples of any of the foregoing and other forms as herein described.

It will be understood, however, that the specific dose level for any particular patient will depend upon a variety of factors including the activity of the specific compound employed, the age, body weight, general health, sex, diet, time of administration, route of administration rate of excretion, drug combination and the severity of the particular disease undergoing therapy. In general, the dosage regimen in carrying out the methods of this invention is that which insures maximum therapeutic response until improvement is obtained and thereafter is the minimum effective level which continues to provide relief.

The 5-phenyl-2-piperidones and 5-phenyl-2-thiopiperidones of this invention are conveniently prepared by the following methods.

When an acrylic acid ester or a substituted acrylate is condensed using Michael reaction conditions with a benzyl or substituted benzyl cyanide, the corresponding γ-cyano-γ-phenyl butyrate (IV) is formed. Catalytic reduction of the nitrile affords the Δ-amino-γ-phenyl valerate (III) which rapidly undergoes intermolecular reaction with the ester group to obtain the desired 5-phenyl-2-piperidones (IIa); activation of the 1-nitrogen followed by treatment with an alkylating or acylating agent results in N-substituted 5-phenyl-2-piperidones (Ia).

When the synthesis of products with various substituents is desired, the Michael condensation is carried out with the appropriately substituted starting materials. Thus, if the 5-(p-chlorophenyl)-3-methyl-2-piperidone is desired, the Michael reaction would commence with α-methyl acrylate and p-chloro-benzyl cyanide.

The following reaction equations illustrate this method of preparation:

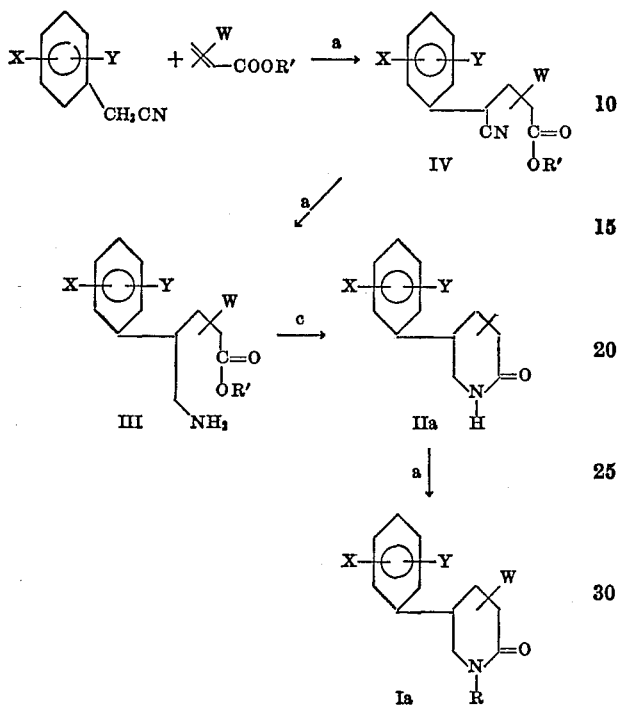

here W, X, Y and R are as defined above and R' is alkyl or aralkyl.

(a) The Michael condensation is carried out in a suitable solvent (preferably a polar solvent, such as ethanol, dioxane, dimethoxyethane, etc.) in the presence of a strong base such as sodium alkoxide, triton B, etc.

(b) Reduction of the nitrile is carried out catalytically in a polar solvent. It is preferable to use Raney nickel in an alcohol under 500–3000 p.s.i.

(c) Upon heating the reduction product between 30 and 125° C. ring closure takes place.

(d) Reacting with a strong base such as sodium hydride in an inert atmosphere activates the 1-nitrogen. Addition of an alkylating or acylating agent, such as an aliphatic tosylate or halide or an alkanoic acid anhydride or halide, or a benzoyl halide results in the N-substituted products.

A further method of preparation involves the reduction of the corresponding 5-phenyl-2-pyridone compounds. When a 5-amino-2-halo pyridine is diazotized in the presence of benzene or a substituted benzene compound, the corresponding 5-phenyl-2-halo pyridine (VI) is formed which upon hydrolysis gives the 5-phenyl-2-[1H]-pyridones (V) selective reduction of the pyridine ring results in the formation of 5-phenyl-2-piperidone compounds (II) which can then be alkylated or acylated as above to prepare the desired N-substituted 5-phenyl-2-piperidone (I) products. The following reaction equation illustrates this method of preparation:

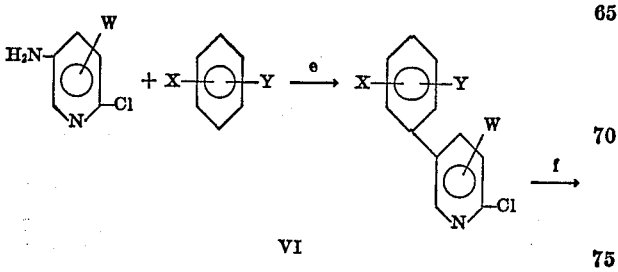

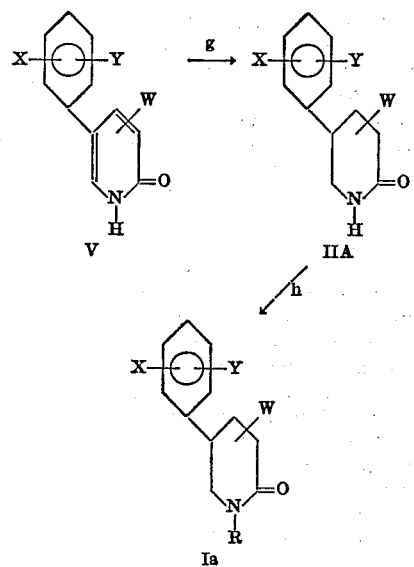

(e) The diazotization of the 2-chloro-5-amino pyridines is carried out with or without an inert solvent in the presence of amyl nitrite and the substituted benzene with heating. Other nitrosating agents may be used in place of amyl nitrite.

(f) Hydrolysis of 2-halo pyridine compounds can be carried out in the presence of a strong base or by the use of a metal acetate in acetic acid.

(g) Selective catalytic reduction of the pyridone ring with a metal catalyst in the presence of hydrogen gives the 5-phenyl-2-piperidones.

(h) Reacting with a strong base such as sodium hydride in an inert atmosphere activates the 1-nitrogen. Addition of an alkylating or acylating agent such as an aliphatic tosylate or halide or an alkanoic acid anhydride or halide, or a benzoyl halide results in the N-substituted products.

The 5-phenyl-2-thiopiperidone (Ib) of this invention can be prepared from the corresponding 5-phenyl-2-piperidones by heating with $P_2S_5$.

The reaction can be carried out either on those compounds which are unsubstituted at the 1-position (IIa) which can then be 1-alkylated or 1-acylated to the desired compounds (Ib), or the products can be prepared from those compounds which are already substituted at the 1-position (Ia). These reactions are represented by the following equations:

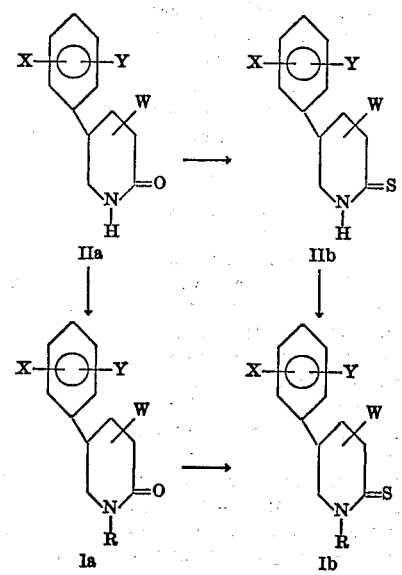

Appropriately desired end products having various W, X and Y substituents can be prepared at various stages of the synthesis using suitable reactions in order to convert one group to another, thus, for example, using conventional methods, a halogen group can be treated under Rosenmund Von Braun conditions to the nitrile compound which in turn can be hydrolyzed to a carboxy. A nitro can be reduced to an amino group and a hydroxy compound can be prepared by demethylation of a methoxy substitutent. Mercapto groups can be prepared from conventional diazotization techniques.

The starting materials of this invention, namely, the benzyl-cyanides and 2-halo-5-amino pyridines are well known in the art.

The intermediate compounds of this invention are not only useful in preparing the end products of this invention but do themselves exhibit anti-inflammatory activity and are therefore useful in the treatment of the same disorders.

The following are a group of detailed examples which show the preparation of desired compounds of this invention. They are to be construed as illustrations of the invention and not as limitations thereof.

EXAMPLE 1

Methyl γ-cyano-γ-(p-chlorophenyl)butyrate

To 91 g. of p-chlorobenzyl cyanide and 6 ml. of Triton B in 360 ml. of dioxane is added 38.7 g. of methyl acrylate over an 80-minute period, while keeping the temperature below 40° C. The reaction mixture is then cooled to room temperature, allowed to stir for 15 hours, and concentrated to a residue. The crude product is partition separated with 800 ml. of ether, 30 drops of acetic acid and 300 ml. of water. The ether layer is washed with water, dried over sodium sulfate, and distilled to obtain methyl γ-cyano-γ-(p-chlorophenyl)-butyrate (B.P. 170–173° C./3 mm.).

EXAMPLE 1a

When an equimolar amount of the nitriles of Table I below are substituted for p-chlorobenzyl cyanide in the procedure of Example 1, the corresponding γ-cyano-γ-(substituted phenyl) butyrate of Table II below is obtained.

Table I benzyl cyanide
p-fluoorbenzyl cyanide
o-fluorobenzyl cyanide
m-fluorobenzyl cyanide
o-chlorobenzyl cyanide
m-chloro-(α-carboethoxy)-benzyl cyanide
p-methoxybenzyl cyanide
o-methoxybenzyl cyanide
m-methoxybenzyl cyanide
p-trifluoromethylbenzyl cyanide
p-dimethylaminobenzyl cyanide
p-methylaminobenzyl cyanide
p-phenyl-α-methyl benzyl cyanide
p-nitrobenzyl cyanide
α-naphthylmethyl cyanide
β-naphthylmethyl cyanide
o-methylbenzyl cyanide
m-methylbenzyl cyanide
p-methylbenzyl cyanide
2,6-dichlorobenzyl cyanide
pentafluorobenzyl cyanide
p-acetylbenzyl cyanide
p-carbomethoxy-α-phenyl benzyl cyanide
p-acetamidobenzyl cyanide
p-dimethylsulfamylbenzyl cyanide
2-methyl-4-chlorobenzyl cyanide
3,4-dimethoxybenzyl cyanide Table II methyl γ-cyano-γ-phenylbutyrate
methyl γ-cyano-γ-(p-fluorophenyl)butyrate
methyl γ-cyano-γ-(o-fluorophenyl)butyrate
methyl γ-cyano-γ-(m-fluorophenyl)butyrate
methyl γ-cyano-γ-(o-chlorophenyl)butyrate
methyl α-carboethoxy-γ-cyano-γ-(m-chlorophenyl)-butyrate
methyl γ-cyano-γ-(p-methoxyphenyl)butyrate
methyl γ-cyano-γ-(p-trifluoromethylphenyl)butyrate
methyl γ-cyano-γ-(p-dimethylaminophenyl)butyrate
methyl γ-cyano-γ-(p-methylaminophenyl)butyrate
methyl α-methyl-γ-cyano-γ-(p-biphenylyl)butyrate
methyl γ-cyano-γ-(p-nitrophenyl)butyrate
methyl γ-cyano-γ-(α-naphthyl)butyrate
methyl γ-cyano-γ-(o-methylphenyl)butyrate
methyl γ-cyano-γ-(2,6-dichlorophenyl)butyrate
methyl γ-cyano-γ-(pentafluorophenyl)butyrate
methyl γ-cyano-γ-(p-acetylphenyl)butyrate
methyl α-phenyl-γ-cyano-γ-(p-carbomethoxyphenyl)-butyrate
methyl γ-cyano-γ-(p-acetamidophenyl)butyrate
methyl γ-cyano-γ-p-dimethylsulfamylphenyl)butyrate
methyl γ-cyano-γ-(2-methyl-4-chlorophenyl)butyrate
methyl γ-cyano-γ-(3,4-dimethoxyphenyl)butyrate EXAMPLE 1b When an equimolar amount of the substituted acrylates of Table III below is used in the procedure of Example 1 with the desired nitrile of Table I, Example 1A, the corresponding γ - cyano - γ - (substituted phenyl) substituted butyrate is formed. A representative list of these products is shown in Table IV below.

Table III methyl α-methyl acrylate
ethyl α-methyl acrylate
methyl α,β-dimethyl acrylate
methyl α-dimethylaminoacrylate
ethyl α-dimethylaminoethylacrylate
methyl β-phenylacrylate
methyl α-phenylacrylate
methyl crotonate Table IV methyl α-methyl-γ-cyano-γ-phenylbutyrate
methyl α-methyl-γ-cyano-γ-(o-methylphenyl)butyrate
methyl α-methyl-γ-cyano-γ-(p-chlorophenyl)butyrate
methyl α-methyl-γ-cyano-γ-(2,6-dichlorophenyl)butyrate
methyl α,β-dimethyl-γ-cyano-γ-(o-methylphenyl)-butyrate
methyl α-dimethylamino-γ-cyano-γ-phenylbutyrate
ethyl α-dimethylaminoethyl-γ-cyano-γ-phenylbutyrate
methyl β-phenyl-γ-cyano-γ-(o-methylphenyl)butyrate
methyl α-phenyl-γ-cyano-γ-(o-methylphenyl)butyrate
methyl α-methyl-γ-cyano-γ-(p-nitrophenyl)butyrate
benzyl α,β-dimethyl-γ-cyano-γ-(p-chlorophenyl)butyrate
benzyl α,β-dimethyl-γ-cyano-γ-(o-methylphenyl)-butyrate
methyl α-methyl-γ-cyano-γ-(2,6-dichlorophenyl)-butyrate
methyl α-methyl-γ-cyano-γ-(p-methoxyphenyl)butyrate
methyl α-methyl-γ-cyano-γ-(2-methyl-4-chlorophenyl)-butyrate
benzyl α,β-dimethyl-γ-cyano-γ-(p-biphenylyl)butyrate
benzyl α,β-dimethyl-γ-cyano-γ-(o-chlorophenyl)-butyrate
methyl α-methyl-γ-cyano-γ-(3,4-dimethoxyphenyl)-butyrate

EXAMPLE 2

5-(p-chlorophenyl)-2-piperidone methyl Δ-amino-γ-(p-chlorophenyl)-valerate

To 11.9 g. of methyl γ-cyano-γ-(p-chlorophenyl)-butyrate and 1 g. of platinum oxide, is added 40 ml.

of glacial acetic acid. This is agitated at room temperature under 40 p.s.i. in a hydrogen atmosphere. The reaction mixture is filtered and concentrated in vacuo to a colorless oil.

5-(p-chlorophenyl)-2-piperidone

To the residue from the above step is added 100 ml. of xylene and the reaction mixture is refluxed for 20 hours. This is then allowed to cool, filtered, and sucked dry. The residue is dissolved in 60 ml. of hot benzene, charcoaled, filtered through a heated funnel, and concentrated to a small volume to obtain 5-(p-chlorophenyl)-2-piperidone (M.P. 171.5–172.5° C.).

EXAMPLE 2a 5-(o-methylphenyl)-2-piperidone

To 13 g. of methyl γ-cyano-γ-(o-methylphenyl)butyrate and 0.5 g. of Raney nickel is added 15 ml. of ethanol. This is reacted at 150° C. under 2000 p.s.i. in a hydrogen atmosphere. The reaction mixture is filtered, rinsed with ethanol and concentrated in vacuo to a solid residue. The residue is dissolved in benzene, filtered and concentrated to a volume of about 65 ml. hot petroleum ether is then added to 125 ml. total volume. This then allowed to cool and the product 5-(o-methylphenyl)-2-piperidone (M.P. 140.5–143° C.) is collected.

EXAMPLE 2b

When an equimolar amount of each of the γ-cyano-γ-(substituted phenyl)butyrate compounds of Tables II and IV, Example 1, are used in place of methyl γ-cyano-γ-(p-chlorophenyl)butyrate in the procedures of Example 2, the corresponding 5-substituted phenyl-2-piperidone is formed. A representative list of these products is shown in Table I below.

Table I 5-phenyl-2-piperidone
5-(p-fluorophenyl)-2-piperidone
5-(o-fluorophenyl)-2-piperidone
5-(m-fluorophenyl)-2-piperidone
5-(o-chlorophenyl)-2-piperidone
5-(m-chlorophenyl)-5-carboethoxy-2-piperidone
5-(p-methoxyphenyl)-2-piperidone
5-(p-trifluoromethylphenyl)-2-piperidone
5-(o-trifluoromethtylphenyl)-2-piperidone
5-(m-trifluoromethylphenyl)-2-piperidone
5-(p-dimethylaminophenyl)-2-piperidone
5-(p-methylaminophenyl)-2-piperidone
5-(p-biphenylyl)-5-methyl-2-piperidone
5-(o-naphthyl)-2-piperidone
5-(α-naphthyl)-2-piperidone
5-(o-methylphenyl)-2-piperidone
5-(2,6-dichlorophenyl)-2-piperidone
5-(p-acetylphenyl)-2-piperidone
5-(p-carbomethoxyphenyl)-5-phenyl-2-piperidone
5-(p-carboxyphenyl)-2-piperidone
5-(p-acetamidophenyl)-2-piperidone
5-(p-dimethylsulfamylphenyl)-2-piperidone
5-(2-methyl-4-chlorophenyl)-2-piperidone
5-(3,4-dimethoxyphenyl)-2-piperidone
3-methyl-5-phenyl-2-piperidone
3-methyl-5-(o-methylphenyl)piperidone
3-methyl-5-(p-chlorophenyl)piperidone
3-methyl-5-(2,6-dichlorophenyl)piperidone
3,4-dimethyl-5-(o-methylphenyl)piperidone
3-dimethylamino-5-phenyl-2-piperidone
3-dimethylaminoethyl-5-phenyl-2-piperidone
4-phenyl-5-(o-methylphenyl)-2-piperidone
3-phenyl-5-(o-methylphenyl)-2-piperidone
3,4-dimethyl-5-(p-chlorophenyl)-2-piperidone
3,4-dimethyl-5-(o-methylphenyl)-2-piperidone
3-methyl-5-(2,6-dichlorophenyl)-2-piperidone
3-methyl-5-(p-methoxyphenyl)-2-piperidone
3-methyl-5-(2-methyl-4-chlorophenyl)-2-piperidone
3,4-dimethyl-5-(p-biphenylyl)-2-piperidone
3,4-dimethyl-5-(o-chlorophenyl)-2-piperidone
3-methyl-5-(3,4-dimethoxyphenyl)-2-piperidone

EXAMPLE 3

5-(p-chlorophenyl)-1-(2-propynyl)-2-piperidone

To 5.23 g. of 5-(p-chlorophenyl)-2-piperidone dissolved in 100 ml. of dimethylformamide is added 1.25 g. of sodium hydride. This is heated at 45° C. for 2½ hours and ice-cooled. To the reaction mixture is then added 3.57 g. of 1-bromo-2-propyne. The reaction mixture is then stirred at room temperature for 10 hours. 200 ml. of ice-water is then added, followed by 3 ml. of 2.5 N HCl. The solid is then filtered and washed with ice-water. The product is recrystallized to obtain pure 5-(p-chlorophenyl)-1-(2-propynyl)-2-piperidone.

EXAMPLE 3a

When an equimolar amount of the reactants of Table I below are used in place of 1-bromo-2-propyne following the procedure of Example 3, the corresponding 5-(p-chlorophenyl)-1-substituted-2-piperidones of Table II below are prepared.

Table I methyl iodide
2-butenyl bromide
4-pentenyl bromide
methallyl bromide
1-bromo-3-pentyne
benzyl chloride
phenethyl bromide
benzoyl chloride
acetyl chloride
cyclopropane carbonyl chloride
1-bromo-3-phenyl-2-propene
β-diethylaminoethyl bromide Table II 5-(p-chlorophenyl)-1-methyl-2-piperidone
5-(p-chlorophenyl)-1-(2-butenyl)-2-piperidone
5-(p-chlorophenyl)-1-(4-pentenyl)-2-piperidone
5-(p-chlorophenyl)-1-methallyl-2-piperidone
5-(p-chlorophenyl)-1-(3-pentynyl)-2-piperidone
5-(p-chlorophenyl)-1-benzyl-2-piperidone
5-(p-chlorophenyl)-1-phenethyl-2-piperidone
5-(p-chlorophenyl)-1-benzoyl-2-piperidone
5-(p-chlorophenyl)-1-acetyl-2-piperidone
5-(p-chlorophenyl)-1-cyclopropylcarbonyl-2-piperidone
5-(p-chlorophenyl)-1-(3-phenyl-2-propenyl)-2-piperidone
5-(p-chlorophenyl)-1-diethylaminoethyl-2-piperidone EXAMPLE 3b Following the procedure of Example 3 but substituting an equimolar amount of the reactant of Table I, Example 3a, in place of 1-bromo-2-propyne and an equimolar amount of the 2-piperidones of Table I, Example 2, and Examples 7 and 9, in place of 5-(p-chlorophenyl)-2-piperidone, the corresponding 1-substituted-2-piperidone products are obtained. A representative list of these products is shown in Table III below.

Table III 5-phenyl-1-(2-propenyl)-2-piperidone
5-phenyl-1-benzyl-2-piperidone
5-phenyl-1-methallyl-2-piperidone
5-phenyl-1-benzoyl-2-piperidone
5-phenyl-1-(3-phenyl-2-propenyl)-2-piperidone
5-phenyl-1-(2-butenyl)-2-piperidone
5-phenyl-1-diethylaminoethyl-2-piperidone
5-(o-methylphenyl)-1-benzoyl-2-piperidone
5-(o-methylphenyl)-1-acetyl-2-piperidone
5-(o-methylphenyl)-1-methallyl-2-piperidone
5-(p-nitrophenyl)-1-benzoyl-2-piperidone 3,4-dimethyl-5-(p-biphenylyl)-2-piperidone
3,4-dimethyl-5-(o-chlorophenyl)-2-piperidone
3-methyl-5-(3,4-dimethoxyphenyl)-2-piperidone 5-(p-nitrophenyl)-1-methallyl-2-piperidone
5-(p-nitrophenyl)-1-(p-chlorobenzoyl)-2-piperidone
5-(2,6-dichlorophenyl)-1-methallyl-3-chloro-2-piperidone
5-(p-fluorophenyl)-1-diethylaminoethyl-2-piperidone
5-(p-acetamidophenyl)-1-phenethyl-2-piperidone
5-(p-dimethylaminophenyl)-1-benzoyl-2-piperidone
5-(p-methoxyphenyl)-1-(p-chlorobenzoyl)-2-piperidone
5-(p-dimethylaminophenyl)-1-(p-chlorobenzoyl)-2-piperidone
5-(α-naphthyl)-1-methyl-2-piperidone
5-(o-methylphenyl)-1-acetyl-4-chloro-2-piperidone
5-(o-methylphenyl)-1-methyl-4-methyl-2-piperidone
5-phenyl-1-acetyl-3-methyl-2-piperidone
5-phenyl-1-acetyl-3-dimethylamino-2-piperidone
5-(p-nitrophenyl)-1-benzyl-3,4-dimethyl-2-piperidone
5-(p-fluorophenyl)-1-(2-butenyl)-3-carboxy-2-piperidone

EXAMPLE 3C 1-phenyl-5-(o-tolyl)-2-piperidone

To 0.025 m. of 5-(o-tolyl)-2-piperidone dissolved in 100 ml. of benzene is added 1.25 g. of sodium hydride. The reaction mixture is heated to ca 45° C. for 8 hours, and then at room temperature for 15 hours. The mixture is then centrifuged and the gel-like N-sodio compound dried in an Abderhalden. This is then added to 5 ml. of iodobenzene and 0.3 g. of copper metal and heated rapidly to 120±2° C. for 35 minutes and then allowed to cool slowly to room temperature. Dry chloroform is then added to a volume of about 50 ml., this is then allowed to stir, filtered and washed with chloroform. The chloroform is evaporated to dryness and the residue chromatographed on 300 g. of silica gel using 10–80% ether-petroleum ether to obtain 1-phenyl-5-(o-tolyl)-2-piperidone.

In a similar manner the 5-aryl-2-piperidone of this invention may be converted to the desired 1-phenyl-5-aryl-2-piperidone.

EXAMPLE 4

5-(o-tolyl)-2-chloropyridine 2-chloro-5-aminopyridine (5 g.) in 50 ml. of anhydrous toluene is added dropwise over ½ hour to 150 ml. of toluene to which has just been added 8 ml. of isoamyl nitrite, and which is held at 50–55° C. The mixture is heated to 75° C. over 2 hours. The solution is decanted from any tars which have precipitated and the excess toluene is removed in vacuo. Distillation of the residue yields 5-(o-tolyl)-2-chloropyridine, and lesser amounts of the m- and p-tolyl isomers.

EXAMPLE 4A

Similarly, when the toluene in the above reaction is replaced by benzene, anisole, benzonitrile, xylene, nitrobenzene, fluorobenzene, benzotrifluoride, naphthylene, o-, m- and p-dichlorobenzenes, hydroquinone, dimethyl ether, veratrole or biphenyl, the corresponding 2-chloro-5-arylpyridine is obtained. The products are mixtures of the isomeric arylpyridines and the isomers are separated by fractional distillation and/or column or vapor phase chromatography. In this way there are obtained:

2-chloro-5-phenyl pyridines
2-chloro-5-(o-, m- and p-methoxyphenyl)pyridines
2-chloro-5-(o-, m- and p-cyanophenyl)pyridines
2-chloro-5-(o-, m- and p-xylenyl)pyridines
2-chloro-5-(o-, m- and p-nitrophenyl)pyridines
2-chloro-5-(o-, m- and p-fluorophenyl)pyridines
2-chloro-5-(o-, m- and p-trifluoromethyl)pyridines
2-chloro-5-(α- and β-naphthyl)pyridines
2-chloro-5-(o,m- m,p- o,o'- o,p'- m,m'- and o,m'-chlorophenyl)pyridines
2-chloro-5-(o,m- m,p- o,o'- o,p'- m,m'- and o,m'-dimethoxyphenyl)pyridines
2-chloro-5-(o,m- m,p- o,o'- o,p'- m,m'- and o,m'-dimethoxyphenyl)pyridines
2-chloro-5-(o-, m- and p-biphenylyl)pyridines

EXAMPLE 4B

When 2-chloro-5-aminopyridine is replaced in Examples 4 and 4A by substituted 2-chloro-5-amino-pyridines, the corresponding substituted 5-phenyl or 5-substituted phenyl-2-chloropyridine products are obtained.

In this way there are obtained the following:

2-chloro-3-methyl-5-phenylpyridine
2-chloro-4-methyl-5-phenylpyridine
2-chloro-3-methyl-5-(o-, m- and p-methylphenyl) pyridine
2-chloro-3-dimethylamino-5-(o-, m- and p-methylphenyl)pyridine
2-chloro-4-diethylaminoethyl-5-(o-, m- and p-nitrophenyl)pyridine
2-chloro-3-phenyl-5-(o-methylphenyl)pyridine
2-chloro-3-carbomethoxymethyl-5-(α-naphthyl)pyridine

EXAMPLE 5

5-(o-tolyl)-2-[1H]pyridone

A mixture of 0.01 moles of 2-chloro-5-(o-tolyl)pyridine, 35 ml. of 20% sodium hydroxide and 50 ml. of dimethylformamide are heated at 100° C. for eight hours. The reaction mixture is cooled, neutralized with dilute hydrochloric acid, concentrated in vacuo, taken up in hot chloroform, and washed with water. The chloroform extract is dried over sodium sulfate and concentrated. The residue is chromatographed on 250 g. of silica gel and eluted with methanol/methylene chloride (0–75%) to give 5-(o-tolyl)-2[1H]pyridone.

EXAMPLE 5A

Similarly, when the other substituted 2-chloro-5-phenylpyridines from Examples 4A and 4B are used in place of 2-chloro-5-(o-tolyl)pyridine, the corresponding 2-pyridone is obtained. In this way there is obtained:

5-(o-, m- and p-methylphenyl)-2[1H]pyridones
5-(o, m- and p-methoxyphenyl)-2[1H]pyridones
5-(o-, m- and p-nitrophenyl)-2[1H]pyridones
5-(o-, m- and p-fluorophenyl)-2[1H]pyridones
5-(o-, m- and p-trifluoromethyl)-2[1H]pyridones
5-(α- and β-naphthyl)-2[1H]pyridones
5-(o,m- m,p- o,o'- o,p'- m,m'- and o,m'-dimethylphenyl)-2[1H]-pyridones
4-(o,m- m,p- o,o'- o,p'- m,m'- and o,m'-dichlorophenyl)-2[1H]pyridones
5-(o,m- m,p- o,o'- o,p'- m,m'- and o,m'-dimethoxyphenyl)-2[1H]pyridones
5-(o-, m- and p-biphenylyl)-2[1H]pyridones
3-methyl-5-phenyl-2[1H]pyridone
4-methyl-5-phenyl-2[1H]pyridone
3-methyl-5-(o-, m- and p-methylphenyl)-2[1H]pyridone
3-dimethylamino-5-(o-, m- and p-methylphenyl)-2[1H] pyridone
4-diethylaminoethyl-5-(o-, m- and p-nitrophenyl)-2[1H] pyridone
3-phenyl-5-(o-methylphenyl)-2[1H]pyridone
3-methyl-5-(α-naphthyl)-2[1H]pyridone

EXAMPLE 6

5-(o-tolyl)-2-piperidone

To 0.01 mole of 5-(o-tolyl)-2-pyridone disolved in 35 ml. of glacial acetic acid is added .2 g. of platinum oxide. The reaction mixture is reduced under hydrogen at room temperature and 40 p.s.i. It is then filtered and concentrated in vacuo and the residue chromatographed using silica gel, eluted with ether/petroleum ether. The product obtained is 5-(o-tolyl)-2-piperidone.

EXAMPLE 6A

When an equimolar amount of the 2-pyridones from Example 5A are used in place of 5-(o-tolyl)-2-pyridone of Example 6, there are obtained the corresponding 2-piperidones. In this way there are obtained:

5-(o-, m- and p-methylphenyl)-2-piperidones
5-(o-, m- and p-methoxyphenyl)-2-piperidones
5-(o-, m- and p-fluorophenyl)-2-piperidones
5-(o-, m- and p-trifluoromethyl)-2-piperidones
5-(α- and β-naphthyl)-2-piperidones
5-(o,m- m,p- o,o'- o,p'- m,m'- and o,m'- dimethylphenyl)-2-piperidones
5-(om,- m,p- o,o'- o,p'- m,m'- and o,m'-dichlorophenyl)-2-piperidones
5-(o,m,- m,p- o,o'- o,p'- m,m'- and o,m'- dimethoxyphenyl)-2-piperidones
5-(o-, m- and p-biphenylyl)-2-piperidones
3-methyl-5-phenyl-2-piperidones
4-methyl-5-phenyl-2-piperidones
3-methyl-5-(o-, m- and p-methylphenyl)-2-piperidones
3-dimethylamino-5-(o-, m- and p-methylphenyl)-2-piperidones
3-phenyl-5-(o-methylphenyl)-2-piperidones
3-methyl-5-(α-naphthyl)-2-piperidones The following representative examples illustrate the interconversion or introduction of functional groups at various stages of the preparation of the final products.

EXAMPLE 7

5-(p-nitrophenyl)-2-piperidone

To 4 ml. of ice cold sulfuric acid is added 1.75 g. of 5-phenyl-2-piperidone. To this is added a mixture of 0.7 ml. nitric acid in 1 ml. cold sulfuric acid over a 40-minute period. This is then stirred for 2 hours and allowed to stand at room temperature for 15 hours. This is then added to 100 ml. of ice-water, filtered, washed with water until the wash water is neutral and sucked dry and recrystallized from dimethoxyethane to obtain 5-(p-nitrophenyl)-2-piperidone.

EXAMPLE 8

5-(p-aminophenyl)-2-piperidone 5-(p-nitrophenyl)-2-piperidone (1 g.) is reduced in 50 ml. of warm dioxane under a hydrogen atmosphere in the presence of 0.3 g. of 5% palladium-on-carbon. The mixture is filtered, washed with warm dioxane, and the combined filtrates concentrated in vacuo to obtain 5-(p-aminophenyl)-2-piperidone.

EXAMPLE 9

1-methyl-5-(p-dimethylaminophenyl)-2-piperidone 1-methyl-5-(p-nitrophenyl)-2-piperidone (1 g.) is reduced in 100 ml. of methanol containing 1 ml. of glacial acetic acid and 3 ml. of 37% formaldehyde in the presence of ¼ teaspoonful of Raney nickel under a hydrogen atmosphere. The mixture is filtered and washed with methanol and concentrated in vacuo. Chromatography on an alumina column using methanol-methylene chloride system (v./v. 0–100%) yields 1-methyl-5-(p-dimethylaminophenyl)-2-piperidone.

EXAMPLE 10

5-(p-hydroxyphenyl)-2[1H]pyridone 5-(p-methoxyphenyl)-2[1H]pyridone (2 g.) is added to a stirred 10 g. portion of pyridine hydrochloride at 188° C. A dry nitrogen atmosphere is maintained. The mixture is kept 20 minutes, allowed to cool, then added to 45 g. of ice. The crude product is collected, dried, and chromatographed using methanol/methylene chloride (0–100%) to obtain 5-(p-hydroxyphenyl)-2[1H]-pyridone.

EXAMPLE 11

5-(o-methylphenyl)-2-thiopiperidone

To 20.8 g. (0.11 mole) of 5-(o-methylphenyl)-2-piperidone in 75 ml. of dry pyridine is added 13 g. (0.058 mole) phosphorus pentasulfide suspended in 75 ml. of dry pyridene. The reaction mixture is refluxed for ½ hour. The pyridine is removed in vacuo and the residue pumped dry at room temperature for several hours. The residual black tar is extracted in a Soxhlet with 1500 ml. benzene and the benzene then evaporated to dryness. The residue is recrystallized from methanol to obtain 5-(o-methylphenyl)-2-thiopiperidone.

EXAMPLE 12

When an equimolar amount of each of the two piperidones of Example 2 are used in place of 5-(o-methylphenyl)-2-piperidone, the corresponding 2-thiopiperidone is prepared.

5-(p-chlorophenyl)-2-thiopiperidone
5-phenyl-2-thiopiperidone
5-(p-fluorophenyl)-2-thiopiperidone
5-(o-chlorophenyl)-2-thiopiperidone
5-(m-chlorophenyl)-5-carboethoxy-2-thiopiperidone
5-(p-methoxyphenyl)-2-thiopiperidone
5-(p-trifluoromethylphenyl)-2-thiopiperidone
5-(p-aminophenyl)-2-thiopiperidone
5-(p-dimethylaminophenyl)-2-thiopiperidone
5-(p-methylaminophenyl)-2-thiopiperidone
5-(p-biphenylyl-5-methyl-2-thiopiperidone
5-(p-nitrophenyl)-2-thiopiperidone
5-(α-naphthyl)-2-thiopiperidone
5-(o-methylphenyl)-2-thiopiperidone
5-(p-hydroxyphenyl)-2-thiopiperidone
5-(2,6-dichlorophenyl)-2-thiopiperidone
5-(p-carbomethoxyphenyl)-5-phenyl-2-thiopiperidone
5-(p-carboxyphenyl)-2-thiopiperidone
5-(p-dimethylsulfamylphenyl)-2-thiopiperidone
5-(2-methyl-4-chlorophenyl)-2-thiopiperidone
5-(3,4-dimethoxyphenyl)-2-thiopiperidone
3-methyl-5-phenyl-2-thiopiperidone
3-methyl-5-(o-methylphenyl)thiopiperidone
3-methyl-5-(p-chlorophenyl)thiopiperidone
3-methyl-5-(2,6-dichlorophenyl)thiopiperidone
3,4-dimethyl-5-(o-methylphenyl)thiopiperidone
3-chloro-5-(p-chlorophenyl)thiopiperidone
3-amino-5-phenyl-2-thiopiperidone
3-dimethylamino-5-phenyl-2-thiopiperidone
3-dimethylaminoethyl-5-phenyl-2-thiopiperidone
4-phenyl-5-(o-methylphenyl)-2-thiopiperidone
3-phenyl-5-(o-methylphenyl)-2-thiopiperidone
3-hydroxy-5-(p-hydroxyphenyl)-2-thiopiperidone
3-methyl-5-(p-nitrophenyl)-2-thiopiperidone
3,4-dimethyl-5-(p-chlorophenyl)-2-thiopiperidone
3,4-dimethyl-5-(o-methylphenyl)-2-thiopiperidone
3-methyl-5-(2,6-dichlorophenyl)-2-thiopiperidone
3-methyl-5-(p-methoxyphenyl)-2-thiopiperidone
3-methyl-5-(2-methyl-4-chlorophenyl)-2-thiopiperidone
3,4-dimethyl-5-(p-biphenylyl)-2-thiopiperidone
3,4-dimethyl-5-(o-chlorophenyl)-2-thiopiperidone
3-methyl-5-(3,4-dimethoxyphenyl)-2-thiopiperidone

EXAMPLE 13

5-(p-chlorophenyl)-1-benzyl-2-thiopiperidone

To 27.9 g. of 5-(p-chlorophenyl)-1-benzyl-2-piperidone in 75 ml. of dry pyridine is added 13 g. (0.058 mole) phosphorus pentasulfide suspended in 75 ml. of dry pyridine. The reaction mixture is refluxed for ½ hour. The pyridine is removed in vacuo and the residue pumped dry at room temperature for several hours. The residual black tar is extracted in a Soxhlet with 1500 ml. benzene and the benzene then evaporated to dryness. The residue is recrystallized from methanol to obtain 5-(p-chlorophenyl)-1-benzyl-2-thiopiperidone.

EXAMPLE 14

When an equimolar amount of each of the 2-piperidones of Table II, Example 3A and Table III, Example 3B, are used in place of the 5-(p-chlorophenyl)-1-benzyl-2-thiopiperidone in Example 13, then the corresponding 2-thiopiperidone is prepared.

5-(p-chlorophenyl)-1-methyl-2-thiopiperidone
5-(p-chlorophenyl)-1-(2-butenyl)-2-thiopiperidone
5-(p-chlorophenyl)-1-(4-pentenyl)-2-thiopiperidone
5-(p-chlorophenyl)-1-methallyl-2-thiopiperidone
5-(p-chlorophenyl)-1-(3-pentynyl)-2-thiopiperidone
5-(p-chlorophenyl)-1-benzyl-2-thiopiperidone
5-(p-chlorophenyl)-1-phenethyl-2-thiopiperidone
5-(p-chlorophenyl)-1-phenyl-2-thiopiperidone
5-(p-chlorophenyl)-1-(3-phenyl-2-propenyl)-2-thiopiperidone
5-(p-chlorophenyl)-1-diethylaminoethyl-2-thiopiperidone
5-phenyl-1-(2-propenyl)-2-thiopiperidone
5-phenyl-1-benzyl-2-thiopiperidone
5-phenyl-1-methallyl-2-thiopiperidone
5-phenyl-1-(3-phenyl-2-propenyl)-2-thiopiperidone
5-phenyl-1-(2-butenyl)-2-thiopiperidone
5-phenyl-1-diethylaminoethyl-2-thiopiperidone
5-phenyl-1-phenyl-2-thiopiperidone
5-(o-methylphenyl)-1-methallyl-2-thiopiperidone
5-(2,6-dichlorophenyl)-1-methallyl-3-chloro-2-thiopiperidone
5-(p-fluorophenyl)-1-diethylaminoethyl-2-thiopiperidone
5-(α-naphthyl)-1-methyl-2-thiopiperidone
5-(o-methylphenyl)-1-acetyl-4-chloro-2-thiopiperidone
5-(o-methylphenyl)-1-methyl-4-methyl-2-thiopiperidone
5-phenyl-1-acetyl-3-methyl-2-thiopiperidone
5-phenyl-1-acetyl-3-dimethylamino-2-thiopiperidone
5-(p-nitrophenyl)-1-benzyl-3,4-dimethyl-2-thiopiperidone
5-(o-methylphenyl)-1-phenyl-2-thiopiperidone The invention is further demonstrated by the following examples in which all parts are by weight.

EXAMPLE 15

A mixture of 250 parts of 5-(p-nitrophenyl)-2-piperidone and 25 parts of lactose is granulated with suitable water, and to this is added 100 parts of maize starch. The mass is passed through a 16 mesh screen. The granules are dried at a temperature below 60° C. The dry granules are passed through a 16 mesh screen, and mixed with 3.8 parts of magnesium stearate. They are then compressed into tablets suitable for oral administration.

The piperidone used in the foregoing example may be replaced by 25, 100 or 500 parts of other piperidones or thiopiperidones of this invention to produce tablets suitable for oral administration as an antiinflammatory, antipyretic and/or analgesic according to the method of this invention.

EXAMPLE 16

A mixture of 50 parts of 5-(p-chlorophenyl)-2-piperidone, 3 parts of the calcium salt of lignin sulphonic acid, and 237 parts of water is ball-milled until the size of substantially all of the particles of the piperidone is less than 10 microns. The suspension is diluted with a solution containing 3 parts of sodium carboxymethylcellulose and 0.9 parts of the butyl ester of p-hydroxybenzoic acid in 300 parts of water. There is thus obtained an aqueous suspension suitable for oral administration for therapeutic purposes.

EXAMPLE 17

A mixture of 250 parts of 5-(o-tolyl)-2-piperidone, 200 parts of maize starch and 30 parts of alginic acid is mixed with a sufficient quantity of 10% aqueous maize starch, and granulated. The granules are dried in a current of warm air and the dry granules are then passed through a 16-mesh screen, mixed with 6 parts of magnesium stearate and compressed into tablet form to obtain tablets suitable for oral administration.

EXAMPLE 18

A mixture of 500 parts of the thiopiperidone of Example 15, 60 parts maize starch and 20 parts of gum acacia is granulated with a sufficient quantity of water. The mass is passed through a 12-mesh screen and the granules are dried in a current of warm air. The dry granules are passed through a 16-mesh screen, mixed with 5 parts of magnesium stearate and compressed into tablet form suitable for oral administration.

EXAMPLE 19

(1) Tablets.—10,000 scored tablets for oral use, each containing 500 mg. of piperidone are prepared from the following ingredients:

|  | Gm. |
|---|---|
| 5-(p-aminophenyl)-2-piperidone | 5000 |
| Starch, U.S.P. | 350 |
| Talc, U.S.P. | 250 |
| Calcium stearate | 35 |

The powdered piperidone is granulated with a 4% w.v. aqueous solution of methylcellulose U.S.P. (1500 cps.). To the dried granules is added a mixture of the remainder of the ingredients and the final mixture compressed into tablets of proper weights.

(2) Capsules.—10,000 two-piece hard gelatin capsules for oral use, each containing 250 mg. of piperidone is prepared from the following ingredients:

|  | Gm. |
|---|---|
| 5-(p-methoxyphenyl)-2-piperidone | 2500 |
| Lactose, U.S.P. | 1000 |
| Starch, U.S.P. | 300 |
| Talc, U.S.P. | 65 |
| Calcium stearate | 25 |

The powdered piperidone is mixed with the starch-lactose mixture followed by the talc and calcium stearate. The final mixture is then encapsulated in the usual manner. Capsules containing 10, 25, 50 and 100 mg. of piperidone are also prepared by substituting 100, 250, 500 and 1000 gm. for 2500 gm. in the above formulation.

(3) Soft elastic capsules.—One-piece soft elastic capsules for oral use, each containing 200 mg. of piperidone are prepared in the usual manner by first dispersing the powdered active material in sufficient corn oil to render the material capsulatable.

(4) Aqueous suspension.—An aqueous suspension for oral use containing in each 5 ml., 1 gram of piperidone is prepared from the following ingredients:

| | | |
|---|---|---|
| 5-phenyl-1-acetyl-2-piperidone | gm | 2000 |
| Methylparaben, U.S.P. | gm | 7.5 |
| Propylparaben U.S.P. | gm | 2.5 |
| Saccharin sodium | gm | 12.5 |
| Cyclamate sodium | gm | 2.5 |
| Glycerin | ml | 3000 |
| Tragacanth powder | gm | 10 |
| Orange oil flavor | gm | 10 |
| F. D. and C. orange dye | gm | 7.5 |
| Deionized water, q.s. to 10,000 mg. | | |

What is claimed is:
1. A compound of the formula:

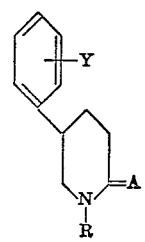

where
A is O or S;
R is hydrogen, loweralkyl, phenyl, benzyl or loweralkynyl; and
Y is chloro, nitro, amino or diloweralkylamino.

2. A compound according to claim 1 where R is hydrogen; and Y is p-nitro.

3. A compound according to claim 1 where R is hydrogen; and Y is p-chloro.

References Cited

Hill et al., J.A.C.S. 81:737–739 (1959).

HENRY R. JILES, Primary Examiner

S. D. WINTERS, Assistant Examiner

U.S. Cl. X.R.

260—293.76, 293.77, 465 D, 471 A, 297 Z, 290 HL, 465 F, 465 G, 465 E; 424—267